(12) United States Patent
Fukuda et al.

(10) Patent No.: US 10,698,161 B2
(45) Date of Patent: Jun. 30, 2020

(54) OPTICAL FIBER WITH LENS AND OPTICAL COUPLER

(71) Applicant: TOYO SEIKAN GROUP HOLDINGS, LTD., Tokyo (JP)

(72) Inventors: Toshiaki Fukuda, Kanagawa (JP); Yosuke Takahashi, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 16/090,665

(22) PCT Filed: Feb. 20, 2017

(86) PCT No.: PCT/JP2017/006158
§ 371 (c)(1),
(2) Date: Oct. 2, 2018

(87) PCT Pub. No.: WO2017/175493
PCT Pub. Date: Oct. 12, 2017

(65) Prior Publication Data
US 2019/0121026 A1    Apr. 25, 2019

(30) Foreign Application Priority Data
Apr. 5, 2016 (JP) ................................. 2016-076143

(51) Int. Cl.
*G02B 6/26*    (2006.01)
*G02B 6/32*    (2006.01)
(Continued)

(52) U.S. Cl.
CPC ............... *G02B 6/262* (2013.01); *G02B 3/00* (2013.01); *G02B 6/02* (2013.01); *G02B 6/30* (2013.01); *G02B 6/32* (2013.01)

(58) Field of Classification Search
CPC . G02B 6/262; G02B 6/32; G02B 6/02; G02B 6/30; G02B 3/00
See application file for complete search history.

(56) References Cited

U.S. PATENT DOCUMENTS 7,099,535 B2    8/2006  Bhagavatula et al.
7,346,237 B2 *  3/2008  Matsumura ............. G02B 6/32
                                                        385/34
(Continued)

FOREIGN PATENT DOCUMENTS

CN    101162830 A    4/2008
JP    55-69104 A     5/1980
(Continued)

OTHER PUBLICATIONS

International Search Report issued in PCT/JP2017/006158, dated Apr. 11, 2017, along with an English translation thereof.
(Continued)

*Primary Examiner* — Ryan A Lepisto
*Assistant Examiner* — Erin D Chiem
(74) *Attorney, Agent, or Firm* — Greenblum & Bernstein, P.L.C.

(57) ABSTRACT

An optical fiber with lens in which one end face of a first GRIN lens is connected to an end face of an optical fiber and one end face of a second GRIN lens is connected to another end face of the first GRIN lens, wherein the optical fiber and the first and second GRIN lenses are coaxially connected, a numerical aperture of the first GRIN lens is smaller than a numerical aperture of the second GRIN lens, and a position in a radial direction of a minimum distribution refractive index nt of the second GRIN lens is set on an inner side of an outer edge of the second GRIN lens and set at a same position as or on an outer side of an outermost periphery of light that is spread by the first GRIN lens.

9 Claims, 4 Drawing Sheets

(51) Int. Cl.
*G02B 6/02* (2006.01)
*G02B 3/00* (2006.01)
*G02B 6/30* (2006.01)

(56) References Cited

U.S. PATENT DOCUMENTS

| | | |
|---|---|---|
| 7,387,452 B2 | 6/2008 | Koyama et al. |
| 2002/0140942 A1 | 10/2002 | Fee et al. |
| 2002/0141714 A1 | 10/2002 | Reed et al. |
| 2002/0146202 A1 | 10/2002 | Reed et al. |
| 2002/0150333 A1 | 10/2002 | Reed et al. |
| 2003/0118305 A1 | 6/2003 | Reed et al. |
| 2004/0028329 A1 | 2/2004 | Reed et al. |
| 2004/0126059 A1* | 7/2004 | Bhagavatula ........ G02B 6/2552 385/33 |
| 2005/0105096 A1 | 5/2005 | Fee et al. |
| 2006/0045419 A1 | 3/2006 | Matsumura et al. |
| 2008/0089643 A1 | 4/2008 | Koyama et al. |
| 2008/0131052 A1 | 6/2008 | Matsumura et al. |

FOREIGN PATENT DOCUMENTS

| | | |
|---|---|---|
| JP | 57-27214 A | 2/1982 |
| JP | 2003-43294 A | 2/2003 |
| JP | 2004-109236 A | 4/2004 |
| JP | 2006-512616 A | 4/2006 |
| JP | 4037346 B2 | 1/2008 |
| KR | 10-2006-0131726 A | 12/2006 |
| WO | 2006/082625 A1 | 8/2006 |

OTHER PUBLICATIONS

Written Opinion issued in PCT/JP2017/006158, dated Apr. 11, 2017, along with an English translation thereof.
Oct. 11, 2019 Office Action in corresponding Chinese patent application No. 201780021709.1 and English translation thereof.
Extended European Search Report issued for corresponding European Patent Application No. 117778872.6 dated Aug. 5, 2019.
Aug. 6, 2019 Office Action for corresponding Korean patent application No. 10-2018-7025551.
Dec. 23, 2019 Office Action for corresponding Korean patent application No. 10-2018-7025551.
Jan. 28, 2020 Office Action in corresponding Japanese patent application No. 2016-076143.
May 8, 2020 Office Action in corresponding Chinese patent application No. 201780021709.1 and its English translation.

* cited by examiner

OPTICAL FIBER WITH LENS AND OPTICAL COUPLER

TECHNICAL FIELD

The present invention relates to an optical fiber with lens and an optical coupler using the optical fiber with lens.

BACKGROUND ART

An optical fiber with lens is an optical fiber coupling component which performs high-efficiency optical coupling of light incident on an optical fiber or light emitted from the optical fiber, and is used for optical coupling between optical fibers, optical coupling between an optical fiber and a light emitting/light receiving element, optical coupling between an optical fiber and an optical component (such as an optical waveguide or an optical integrated circuit), and the like.

A GRIN lens fused and connected to an optical fiber is known as a conventional optical fiber with lens. GRIN lens is short for gradient index lens which is a columnar (rod-like) lens with a refractive index distribution $n(r)$ in a direction of a radius r satisfying $n(r)=n_0(1-(\frac{1}{2})(g \cdot r)^2)$. In this case, $n_0$ denotes a central refractive index and g denotes a constant (a refractive index distribution constant) that represents a light condensing ability of the GRIN lens. When a radius of the GRIN lens is denoted by R, a minimum refractive index (minimum distribution refractive index) nt of the refractive index distribution is a refractive index in an outer edge part of the lens, satisfying $nt=n(R)=n_0(1-(\frac{1}{2})(G \cdot R)^2)$.

Since a GRIN lens has a columnar shape, an optical fiber with lens using a GRIN lens provides an advantage in that mechanical axis alignment during optical coupling is facilitated by making an outer diameter of the optical fiber and an outer diameter of the GRIN lens approximately the same, and also provides an advantage of improving space efficiency when arranging a plurality of optical fiber with lens in parallel to form an array.

An optical fiber with lens using a GRIN lens is generally used as a collimator which collimates light from an optical fiber or a condenser which condenses light from an optical fiber. In particular, examples of use as a condenser include optical coupling between a light emitting element (for example, a semiconductor laser) and an optical fiber. Such a case requires a GRIN lens of which light condensing ability is high enough to sufficiently cover an emission angle of the light emitting element and also requires that light incident on the GRIN lens is incident on a core of the optical fiber within a critical angle of the optical fiber.

As an optical fiber with lens which accommodates such requests, an optical fiber with a GRIN lens is developed in which a GRIN lens with a relatively low NA is connected to an end face of an optical fiber and a GRIN lens with a relatively high NA is connected to an end face of the GRIN lens with the relatively low NA (refer to PTL 1 below). In this case, NA is short for numerical aperture and, using g described earlier and a radius R and a central refractive index $n_0$ of a GRIN lens, NA is expressed as $NA=n_0 \cdot g \cdot R$.

CITATION LIST

Patent Literature

[PTL 1] Japanese Patent No. 4037346

SUMMARY OF INVENTION

Technical Problem

As shown in FIG. 1, with an optical fiber with lens 1 in which a low NA GRIN lens 3 is connected to an end face of an optical fiber 2 and a high NA GRIN lens 4 is connected to an end face of the GRIN lens 3, a mode of coupled light L (light incident on an optical fiber or light emitted from the optical fiber) approximates that of a Gaussian beam and a beam waist is formed at a position at a prescribed distance (a beam waist distance $L_0$) from an end face of the high NA GRIN lens 4. In other words, the coupled light L does not converge even at a best focused position and a beam spot with a prescribed diameter (a beam waist diameter $2\omega_0$) is formed instead.

A beam spot can be considered an image with a mode field diameter $2\omega s$ which is a size of light propagating through a core of the optical fiber 2 and, in particular, a size of base mode light in a case of a single-mode optical fiber, and when the beam waist distance $L_0$ is short, a reduction rate is created based on a ratio between the NA (NA1) of the low NA GRIN lens 3 and the NA (NA2) of the high NA GRIN lens 4. In other words, the beam waist diameter satisfies $2\omega_0=2\omega s \times (NA1/NA2)$.

Optical components which perform optical coupling with the optical fiber with lens 1 described above are becoming increasingly diversified with the progress of optics-related technology including optical communications, and incidence/emittance diameters of optical components are becoming smaller and smaller. In order to perform optical coupling with such optical components with a high coupling efficiency, the beam waist diameter $2\omega_0$ of the optical fiber with lens 1 described above must be further reduced. For example, when considering optical coupling with an optical integrated circuit, since the optical integrated circuit may include optical waveguides with a diameter of 3 μm or less, the beam waist diameter must be reduced to 3 μm or less when directly connecting the optical fiber with lens 1 and the optical integrated circuit with each other.

In theory, the beam waist diameter can be reduced by either setting the central refractive index $n_0$ of the high NA GRIN lens 4 higher or setting the minimum distribution refractive index nt of the high NA GRIN lens 4 lower to increase the NA of the GRIN lens 4 and make the refractive index distribution steep (increase the g value). However, since setting a higher central refractive index $n_0$ or a lower minimum distribution refractive index nt is realized through selection of a glass material that forms a base of the GRIN lens 4 and a dopant material, there is a natural limit to the settings. Therefore, there is a demand for further reducing the beam waist diameter at a setting of the central refractive index $n_0$ or the minimum distribution refractive index nt equivalent to that in prior art and without having to take material selection into consideration.

Alternatively, the beam waist diameter can theoretically be reduced by setting the NA of the low NA GRIN lens 3 lower to make the refractive index distribution flatter. However, since lowering the NA of the low NA GRIN lens 3 causes a beam to spread excessively and a skirt portion of the spread beam reaches an outer wall of the lens and causes loss, there is a natural limit to these settings as well.

The present invention has been proposed in order to cope with such situations. Specifically, an object of the present invention is to achieve a reduction in a beam waist diameter in an optical fiber with lens using a GRIN lens without having to take material selection of the GRIN lens into consideration.

Solution to Problem

In order to solve the problems described above, an optical fiber with lens according to the present invention is configured as follows.

An optical fiber with lens in which one end face of a first GRIN lens is connected to an end face of an optical fiber and one end face of a second GRIN lens is connected to another end face of the first GRIN lens, wherein the optical fiber and the first and second GRIN lenses are coaxially connected, a numerical aperture of the first GRIN lens is smaller than a numerical aperture of the second GRIN lens, and a position in a radial direction of a minimum distribution refractive index of the second GRIN lens is set on an inner side of an outer edge of the second GRIN lens and set at a same position as or on an outer side of an outermost periphery of light that is spread by the first GRIN lens.

Advantageous Effects of Invention

With the optical fiber with lens configured as described above, by setting the position in the radial direction of the minimum distribution refractive index of the second GRIN lens on an inner side of the outer edge of the second GRIN lens and at a same position as or on an outer side of an outermost periphery of light that is spread by the first GRIN lens, light emitted from the optical fiber can be propagated without loss and the refractive index distribution of the second GRIN lens can be made steep without changing material selection which sets the central refractive index and the minimum distribution refractive index of the second GRIN lens.

Accordingly, a beam waist diameter of the optical fiber with lens when used as a condenser can be reduced and optical coupling with an optical component of which incidence/emittance diameters are extremely small can be performed with high efficiency.

DESCRIPTION OF EMBODIMENTS

Figure 1:
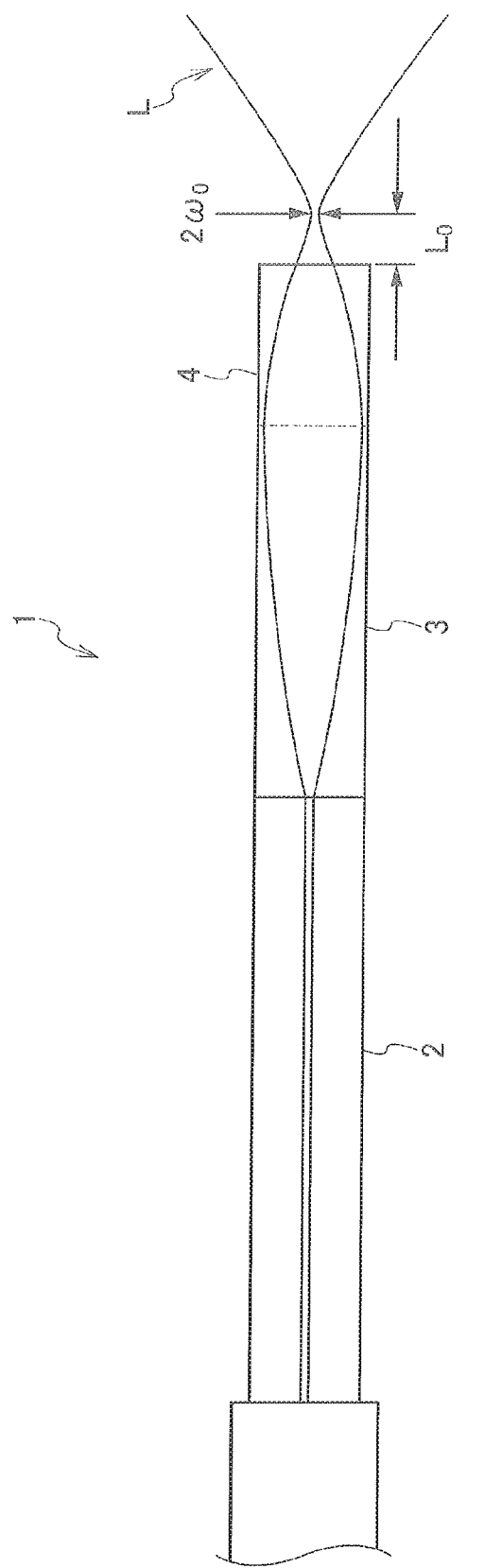
FIG. 1 is an explanatory diagram of an optical fiber with lens using a GRIN lens.

Hereinafter, an embodiment of the present invention will be described with reference to the drawings. As shown in FIG. 1, an optical fiber with lens 1 according to an embodiment of the present invention is provided with an optical fiber 2, a first GRIN lens 3, and a second GRIN lens 4, and functions as a condenser (collector). In this case, the optical fiber 2, the first GRIN lens 3, and the second GRIN lens 4 are coaxially connected. Specifically, one end face of the first GRIN lens 3 is fused and connected to an end face of the optical fiber 2, and one end face of the second GRIN lens 4 is fused and connected to another end face of the first GRIN lens 3.

When a numerical aperture of the first GRIN lens 3 is denoted by NA1 and a numerical aperture of the second GRIN lens 4 is denoted by NA2, the optical fiber with lens 1 is set so as to satisfy NA1<NA2. Accordingly, the first GRIN lens 3 once expands a beam diameter of light emitted from the optical fiber 2 and the second GRIN lens 4 condenses the light to form a beam spot with a beam waist diameter $2\omega_0$ on an end face of the second GRIN lens 4 or in a vicinity thereof.

When a radius of the first GRIN lens 3 is denoted by R1, a radius of the second GRIN lens 4 is denoted by R2, and a radius (cladding radius) of the optical fiber 2 is denoted by R, adopting a configuration expressed as R=R1=R2 enables the optical fiber with lens 1 in which mechanical optical axis alignment can be readily performed using a sleeve or the like to be obtained. However, the optical fiber with lens 1 according to the embodiment of the present invention is not limited thereto and a configuration expressed as R≤R1≤R2 may be adopted instead.

Figure 2:
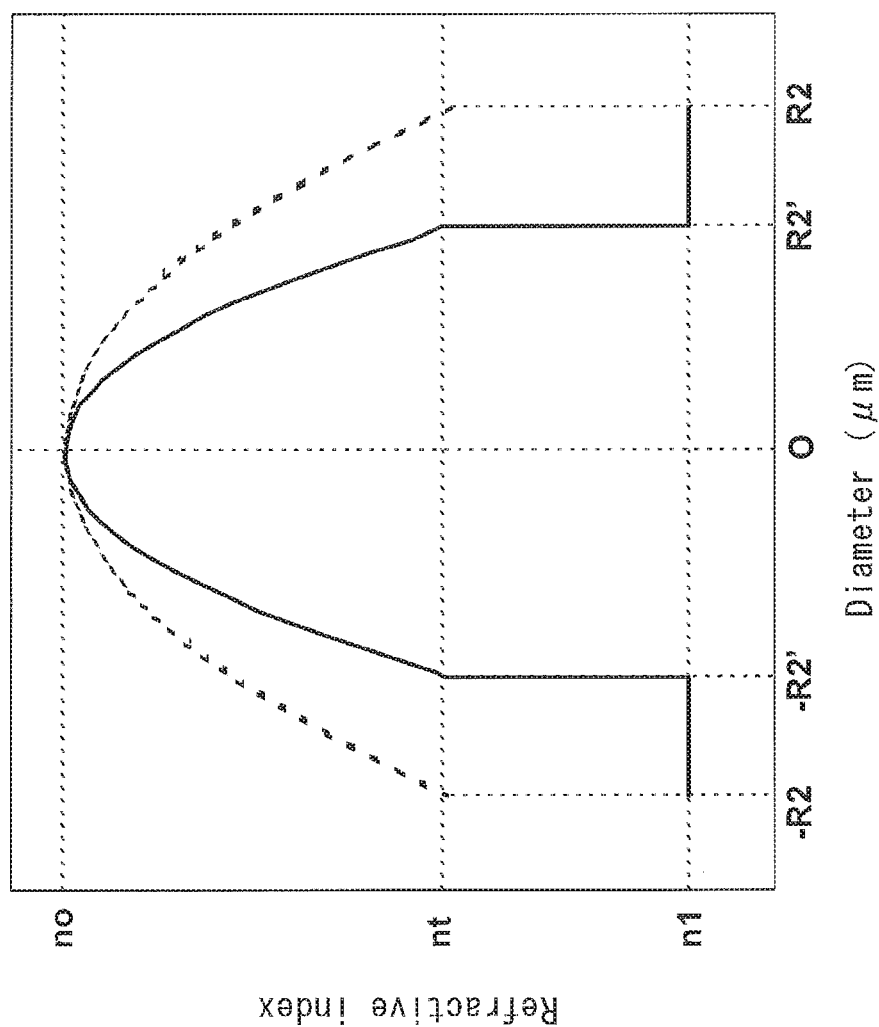
FIG. 2 is an explanatory diagram showing a refractive index distribution of a second GRIN lens in an optical fiber with lens according to an embodiment of the present invention.

FIG. 2 shows a refractive index distribution of the second GRIN lens 4 in the optical fiber with lens 1 according to the embodiment of the present invention. The refractive index distribution of the second GRIN lens 4 has a central refractive index of $n_0$, exhibits a parabolic refractive index distribution expressed as $n(r)=n_0(1-(1/2)(g' \cdot r)^2)$ when a distance r from center is $0 \leq r \leq R2'$, and assumes a minimum distribution refractive index nt (a minimum value of parabolically-distributed refractive indices) when the distance from center is R2'. The refractive index distribution has a constant value (n1) when the distance r from center is R2'<r≤R2. In this case, R2 denotes a radius (outer diameter/2) of the GRIN lens 4, and R2' denotes an effective radius (R2'<R2) of the GRIN lens 4. In other words, in the optical fiber with lens 1 according to the embodiment of the present invention, a position in the radial direction of the minimum distribution refractive index nt of the second GRIN lens 4 is set on an inner side of an outer edge of the second GRIN lens 4.

In addition, a relationship between a beam diameter $2\omega G1$ of light incident on the first GRIN lens 3 from the optical fiber 2 upon arrival at an interface of the second GRIN lens 4 after the beam diameter has been expanded inside the first GRIN lens 3 and a diameter 2R2' of the minimum distribution refractive index of the second GRIN lens 4 is set to $2\omega G1 \leq 2R2'$. In other words, in the optical fiber with lens 1 according to the embodiment of the present invention, a position in the radial direction of the minimum distribution refractive index nt of the second GRIN lens 4 is set at a same position as or on an outer side of an outermost periphery of light incident on the first GRIN lens 3 from the optical fiber 2 and expanded by the first GRIN lens 3. Furthermore, the diameter 2R2' of the minimum distribution refractive index nt of the second GRIN lens and a diameter 2R1 of the first GRIN lens 3 is set so as to satisfy 2R2'<2R1.

With the optical fiber with lens 1 provided with the first GRIN lens 3 and the second GRIN lens 4 configured as described above, light emitted from the optical fiber 2 propagates through the first GRIN lens 3 and the second GRIN lens 4 without any loss and, furthermore, the beam waist diameter formed in a vicinity or on an outer side of an end face of the second GRIN lens 4 can be reduced.

In the GRIN lens 4 which exhibits such a refractive index distribution, the central refractive index $n_0$ and the minimum distribution refractive index nt are set by materials that form the GRIN lens 4. For example, when a silica glass ($SiO_2$) base and titanium oxide ($Ti_2O_3$) as a dopant material (metallic additive) are selected for the GRIN lens 4, the central refractive index $n_0$ can be set to 1.53 and the minimum distribution refractive index nt can be set to 1.49.

In a case of prior art in which a similar material selection is made, the same central refractive index $n_0$ and minimum distribution refractive index nt are set, and a position in the radial direction of the minimum distribution refractive index nt is set close to an outer edge of the GRIN lens, a refractive index distribution ($n(r)=n_0(1-(½)(g \cdot r)^2)$) depicted by a dashed line in FIG. 2 is exhibited. A comparison of a refractive index distribution coefficient g in this case with g' in the refractive index distribution ($n(r)=n_0(1-(½)(g' \cdot r)^2)$) when the distance r from center satisfies $0 \le r \le R2'$ in the second GRIN lens 4 according to the embodiment of the present invention shows that, since NA is the same but the diameter (effective diameter) is reduced, g<g' is satisfied. In other words, the GRIN lens 4 according to the embodiment of the present invention in which the refractive index distribution coefficient is g', the g value is higher as compared to prior art.

When the beam waist distance $L_0$ is near an end face of the second GRIN lens 4, a magnification of the beam waist diameter $2\omega_0$ which can be regarded as an image of light propagating through the core of the optical fiber 2 can be expressed as a ratio between a product of a g value (g1) and a central refractive index ($n_0$) in the low NA first GRIN lens 3, and a product of a g value (g2=g') and a central refractive index ($n_0$) of the high NA second GRIN lens 4. In other words, the magnification is expressed as $(g1 \cdot n_{01})/(g' \cdot n_0)$. When the g value and the central refractive index $(g1 \cdot n_{01})$ of the first GRIN lens 3 is considered constant, the beam waist diameter $2\omega_0$ which is an image decreases in proportion to an increase of the high NA-side g value in the embodiment of the present invention adopting the GRIN lens 4 satisfying g<g' as compared to g in prior art.

Figure 3:
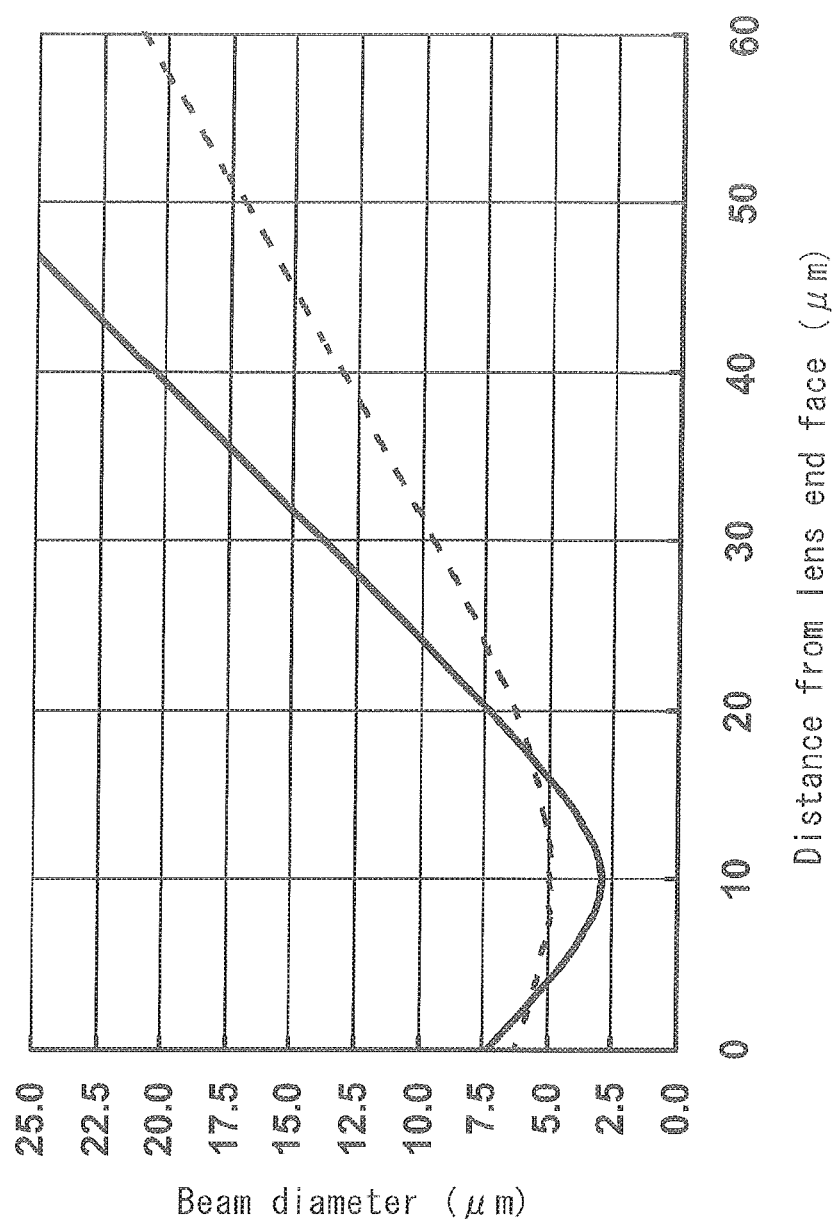
FIG. 3 is an explanatory diagram showing a mode (a beam diameter relative to a distance from a lens end face) of coupled light in an optical fiber with lens.

FIG. 3 shows a mode (a beam diameter relative to a distance from a lens end face) of the coupled light L in the optical fiber with lens 1. In the diagram, a solid line depicts a mode of a case (the embodiment of the present invention) where the refractive index distribution of the second GRIN lens 4 is set to the solid line shown in FIG. 2, and a dashed line depicts a mode of a case (prior art) where the refractive index distribution of the second GRIN lens 4 is set to the dashed line shown in FIG. 2. As shown, while the beam waist diameter (a beam diameter at a distance of 10 μm from a lens end face) $2\omega_0$ is around 5.0 μm in prior art, the beam waist diameter $2\omega_0$ is reduced to 3 μm or less in the embodiment of the present invention. In this manner, the optical fiber with lens 1 according to the embodiment of the present invention enables the g value of the second GRIN lens 4 to be increased and the beam waist diameter to be reduced without having to adjust refractive indices by material selection.

Hereinafter, a method of manufacturing the second GRIN lens 4 will be described. The GRIN lens 4 with a refractive index distribution similar to that depicted by the solid line in FIG. 2 can be manufactured by applying a rod-in-tube method which is a known method of manufacturing optical fibers. Specifically, a base material of a GRIN lens according to prior art is covered by a quartz tube and then stretched in a similar manner to a GRIN lens manufacturing method in prior art so as to match an outer diameter to a set outer diameter (2×R2). Subsequently, cutting for adjusting a lens length is performed to obtain the second GRIN lens 4. The second GRIN lens 4 manufactured in this manner exhibits a parabolic refractive index distribution as depicted by the solid line in FIG. 2 within an effective diameter (2×R2'), and a quartz glass tube layer which does not contain a dopant material is provided on an outer side of the effective diameter (2×R2') (n1 in FIG. 2 denotes a refractive index of quartz glass).

Figure 4:
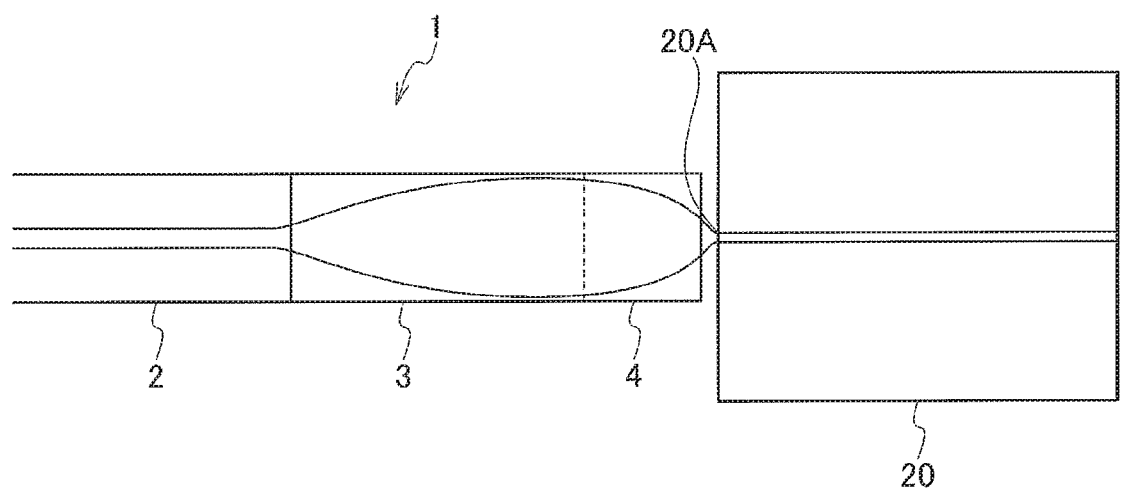
FIG. 4 is an explanatory diagram showing a configuration example of an optical coupler in which the optical fiber with lens according to the embodiment of the present invention is optically coupled with an optical component (an optical waveguide).

FIG. 4 shows a configuration example of an optical coupler in which the optical fiber with lens according to the embodiment of the present invention is optically coupled with an optical component. In this case, an example is shown in which an optical waveguide 20 such as an optical integrated circuit and the optical fiber with lens 1 are coupled with each other. In this example, an end face of the second GRIN lens 4 in the optical fiber with lens 1 and a connecting end face of the optical waveguide 20 are arranged so as to oppose each other, and both end faces are either directly connected or connected via a coupling material such as an adhesive or a refractive index matching agent. In doing so, by causing the beam waist position in the optical fiber with lens 1 to approach or match the end face of the second GRIN lens 4, direct connection can be performed with low loss, and by setting the beam waist diameter having been reduced by the optical fiber with lens 1 equal to or smaller than a diameter of a core 20A of the optical waveguide 20, highly efficient coupling can be realized.

As described above, the optical fiber with lens 1 according to the embodiment of the present invention and an optical coupler using the optical fiber with lens 1 enables light coupled with the optical fiber 2 to be propagated without loss and enables a beam waist diameter of the optical fiber with lens 1 using the first and second GRIN lenses 3 and 4 to be reduced without having to take adjustment of refractive indices by material selection into consideration. Accordingly, the optical fiber with lens 1 according to the embodiment of the present invention and an optical coupler using the optical fiber with lens 1 enables highly efficient optical coupling to be performed while accommodating minimization of incidence/emittance diameters of optical components that are objects of coupling.

REFERENCE SIGNS LIST

1 Optical fiber with lens
2 Optical fiber
3, 4 GRIN lens
20 Optical waveguide
20A Core

The invention claimed is:

1. An optical fiber with lenses in which one end face of a first GRIN lens is connected to an end face of an optical fiber and one end face of a second GRIN lens is connected to another end face of said first GRIN lens, wherein said optical fiber and said first and second GRIN lenses are coaxially connected, and a numerical aperture of said first GRIN lens is smaller than a numerical aperture of said second GRIN lens, and a position in a radial direction of a minimum value of parabolically-distributed refractive indices and a minimum distribution refractive index of said second GRIN lens is set on an inner side of an outer edge of said second GRIN lens and is set at a same position as or on an outer side of an outermost periphery of light that is spread by said first GRIN lens.

2. The optical fiber with lenses according to claim 1, wherein said first and second GRIN lenses have a same diameter as said optical fiber.

3. The optical fiber with lenses according to claim 1, wherein a dopant material is not contained on an outer side of said position of said minimum value of parabolically-distributed refractive indices and said minimum distribution refractive index in said second GRIN lens.

4. The optical fiber with lenses according to claim 1, wherein a beam waist diameter of coupled light of said optical fiber with the lenses is 3 μm or less.

5. An optical coupler in which the optical fiber with lenses according to claim 1 and an optical component are optically coupled with each other.

6. The optical fiber with lenses according to claim 1, said first GRIN lens is configured to expand a beam diameter of light and said second GRIN lens is configured to condense the light.

7. An optical coupler in which the optical fiber with lenses according to claim 6 and an optical component are optically coupled with each other.

8. An optical fiber with lenses in which one end face of a first GRIN lens is connected to an end face of an optical fiber and one end face of a second GRIN lens is connected to another end face of said first GRIN lens, wherein
    said optical fiber and said first and second GRIN lenses are coaxially connected, and a numerical aperture of said first GRIN lens is smaller than a numerical aperture of said second GRIN lens,
    a position in a radial direction of a minimum value of parabolically-distributed refractive indices and a minimum distribution refractive index of said second GRIN lens is set on an inner side of an outer edge of said second GRIN lens and is set at a same position as or on an outer side of an outermost periphery of light that is spread by said first GRIN lens, and
    the refractive index distribution of said second GRIN lens is constant between an effective radius thereof and the radius thereof.

9. An optical coupler in which the optical fiber with lenses according to claim 8 and an optical component are optically coupled with each other.

* * * * *